US010313545B2

(12) United States Patent
Kodama et al.

(10) Patent No.: US 10,313,545 B2
(45) Date of Patent: Jun. 4, 2019

(54) IMAGE PROCESSING APPARATUS, ACTIVATION CONTROL METHOD AND NON-TRANSITORY COMPUTER-READABLE RECORDING MEDIUM ENCODED WITH ACTIVATION CONTROL PROGRAM

(71) Applicant: Konica Minolta, Inc., Chiyoda-ku, Tokyo (JP)

(72) Inventors: Kana Kodama, Anjo (JP); Hiroyasu Ito, Okazaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/679,625

(22) Filed: Aug. 17, 2017

(65) Prior Publication Data

US 2018/0063350 A1 Mar. 1, 2018

(30) Foreign Application Priority Data

Aug. 26, 2016 (JP) .................. 2016-165513

(51) Int. Cl.
*G06F 1/26* (2006.01)
*G06F 3/12* (2006.01)
*H04N 1/00* (2006.01)
(Continued)

(52) U.S. Cl.
CPC ......... *H04N 1/00891* (2013.01); *G06F 1/266* (2013.01); *G06F 1/3225* (2013.01);
(Continued)

(58) Field of Classification Search
None
See application file for complete search history.

(56) References Cited

U.S. PATENT DOCUMENTS 9,369,453 B2 * 6/2016 Ishikura ............... H04L 63/08
2006/0152762 A1 * 7/2006 Asano .................... H04N 1/21
358/1.18
(Continued)

FOREIGN PATENT DOCUMENTS

CN 1841348 A 10/2006
JP 2001-229073 A 8/2001
JP 2008-70975 A 3/2008

OTHER PUBLICATIONS

Office Action dated Dec. 29, 2018 by the State Intellectual Property Office of People's Republic of China in corresponding Chinese Patent Application No. 201710740864.04 and an English translation of the Office Action. (24 pages).

*Primary Examiner* — Miya J Williams
(74) *Attorney, Agent, or Firm* — Buchanan Ingersoll & Rooney PC

(57) ABSTRACT

An image processing apparatus includes a volatile first memory, a non-volatile second memory, a hardware processor, a power supply and a delay unit, wherein the hardware processor executes a process defined by a program, after execution of the program ends, deletes data stored in the second memory by execution of the program by overwriting the stored data with predetermined data, in response to the generation of the stop trigger, stores data, stored in the first memory, in the second memory as a snapshot, in response to generation of a start trigger, transfers the snapshot stored in the second memory to the first memory, and in the case where prospective deletion data that is to be deleted is stored in the second memory in a stage where the stop trigger is generated, overwrites the prospective deletion data with the snapshot without overwriting the prospective deletion data with the predetermined data.

17 Claims, 7 Drawing Sheets

(51) Int. Cl.
*H04N 1/21* (2006.01)
*G06F 12/06* (2006.01)
*G06F 1/3225* (2019.01)

(52) U.S. Cl.
CPC ............ *G06F 3/122* (2013.01); *G06F 3/1221* (2013.01); *G06F 3/1222* (2013.01); *G06F 3/1274* (2013.01); *G06F 12/0638* (2013.01); *H04N 1/00904* (2013.01); *H04N 1/00928* (2013.01); *H04N 1/2108* (2013.01); *G06F 3/1273* (2013.01); *G06F 2212/205* (2013.01); *H04N 1/00411* (2013.01); *H04N 2201/0094* (2013.01); *H04N 2201/216* (2013.01); *H04N 2201/218* (2013.01)

(56) References Cited

U.S. PATENT DOCUMENTS

| | | | | |
|---|---|---|---|---|
| 2007/0146785 A1* | 6/2007 | Akiyama | ............ | G06F 3/1217 358/1.16 |
| 2007/0180536 A1* | 8/2007 | Kanai | ............ | G06F 21/31 726/30 |
| 2008/0021862 A1* | 1/2008 | Ohta | ............ | G06F 21/83 |
| 2008/0215598 A1* | 9/2008 | Haga | ............ | G06F 3/1205 |
| 2010/0238507 A1* | 9/2010 | Matsushima | ............ | G03G 15/50 358/1.16 |
| 2012/0131320 A1* | 5/2012 | Park | ............ | G06F 9/4401 713/2 |
| 2013/0036300 A1* | 2/2013 | Baik | ............ | G06F 9/4401 713/2 |
| 2013/0061080 A1* | 3/2013 | Shimizu | ............ | G06F 1/3284 713/323 |
| 2013/0258409 A1* | 10/2013 | Shintani | ............ | H04N 1/00928 358/1.16 |
| 2013/0282662 A1* | 10/2013 | Kumarasamy | ............ | G06F 17/30289 707/649 |
| 2014/0185098 A1* | 7/2014 | Araya | ............ | H04N 1/00347 358/1.16 |
| 2015/0278088 A1* | 10/2015 | Ito | ............ | G06F 3/0608 711/103 |
| 2016/0057304 A1* | 2/2016 | Yamaguchi | ............ | H04N 1/00891 358/1.14 |
| 2017/0244854 A1* | 8/2017 | Ito | ............ | H04N 1/00891 |

* cited by examiner

F I G. 1
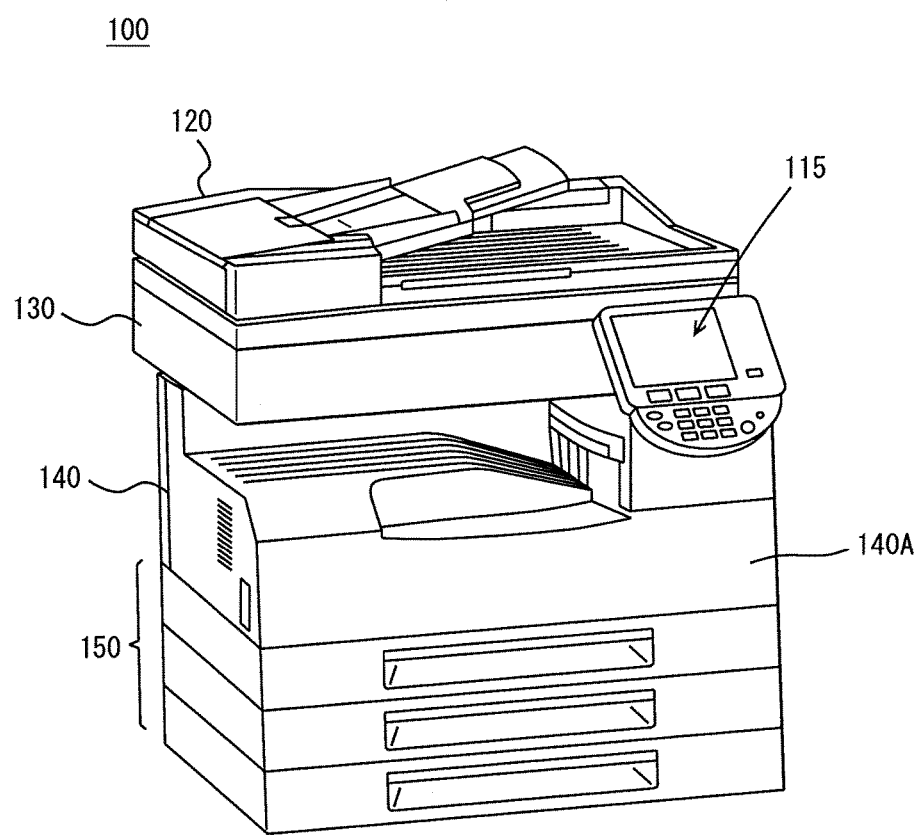

F I G. 7
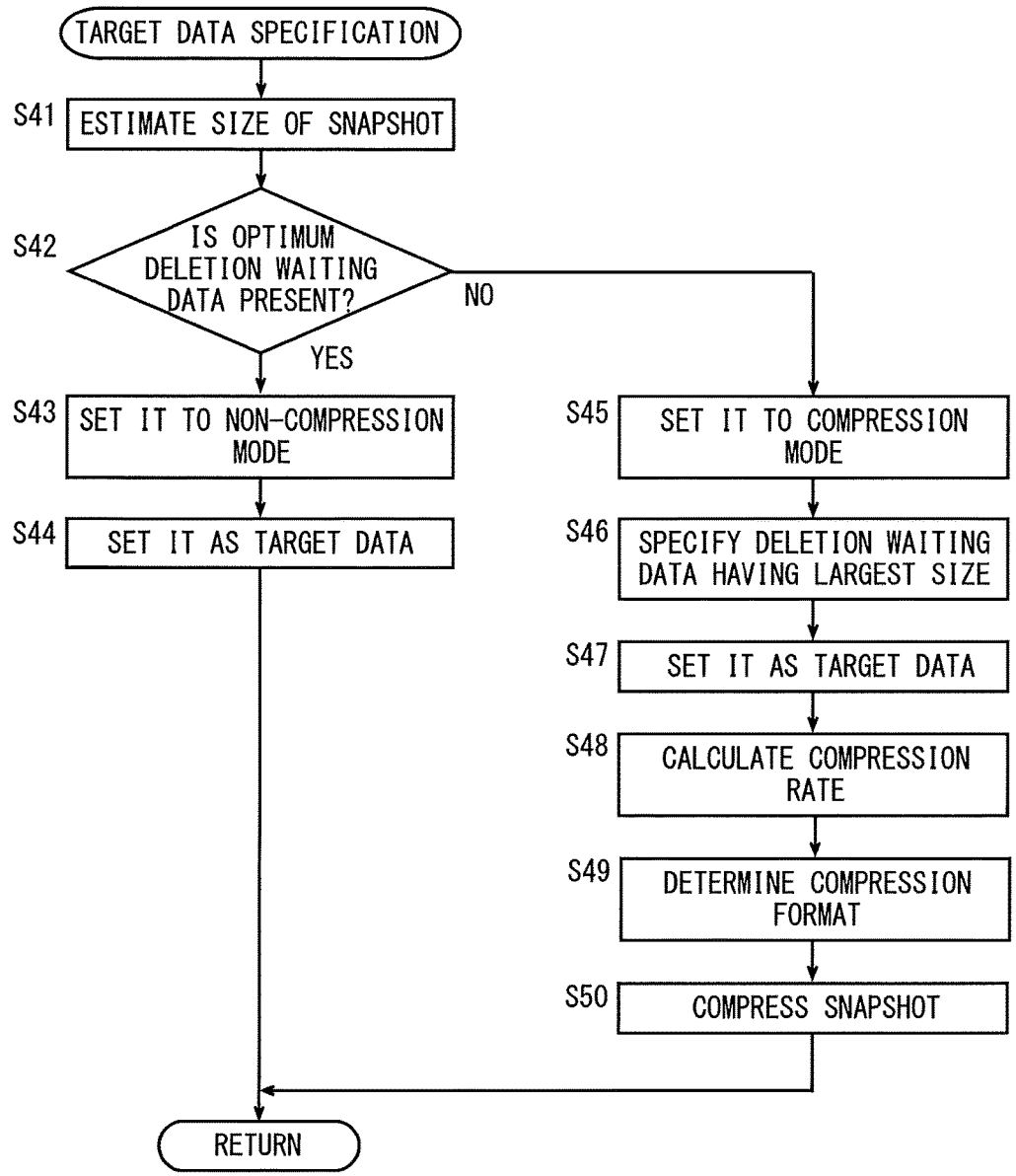

IMAGE PROCESSING APPARATUS, ACTIVATION CONTROL METHOD AND NON-TRANSITORY COMPUTER-READABLE RECORDING MEDIUM ENCODED WITH ACTIVATION CONTROL PROGRAM

Japanese Patent Application No. 2016-165513 filed on Aug. 26, 2016 including description, claims, drawings, and abstract, the entire disclosure is incorporated herein by reference in its entirety.

BACKGROUND

Technological Field

The present invention relates to an image processing apparatus. More specifically, the present invention relates to an image processing apparatus that stores data, stored in a volatile memory, in a non-volatile memory as a snapshot and loads the snapshot into the volatile memory for execution at the time of restart, and an activation control method performed by the image processing apparatus, and a non-transitory computer-readable recording medium encoded with an activation control program that allows a computer controlling the image processing apparatus to perform the activation control method.

Description of the Related Art

In recent years, an image processing apparatus represented by an MFP (Multi Function Peripheral) includes a CPU (Central Processing Unit) and a RAM (Random Access Memory), and the CPU loads a program into the RAM for execution. A technique for storing data, stored in the RAM, in a non-volatile memory such as a flash memory as a snapshot before the CPU ceases to operate in order to reduce the time required for the MFP to be supplied with power and be ready to operate.

While the power supplied to the CPU is shut off by an operation of turning off the power supply of the MFP by a user, a capacitor or the like is used as a power supply for allowing a process of storing a snapshot to be executed. Therefore, a time period, during which the CPU is able to operate after the operation of turning off the power supply of the MFP by the user, is limited. Thus, after the user performs the operation of turning off the power supply, the storage of the snapshot must be completed within the time period during which the CPU is able to operate.

On the other hand, the MFP sometimes temporarily stores image data, that is a target for a process such as copying, in the flash memory, and sometimes deletes the data stored in the flash memory after the process ends. The data stored in the flash memory is managed as a file in a file system. In this file system, a region in which data is actually stored is associated with file information. In the case where the data is deleted, only the file information is changed, and the data is not deleted. In the MFP, a complete deletion process of overwriting image data to be deleted with arbitrary data is executed in order to prevent the image data to be processed from being stored and remaining in the flash memory. In the case where the MFP continuously executes jobs such as a copying process and the like, the execution of the jobs is sometimes given priority and the complete deletion process is sometimes postponed because the complete deletion requires a predetermined time period.

The user sometimes performs an operation of turning off the power supply of the MFP with image data to be deleted present in the MFP. In this case, the complete deletion process of the image data is executed, and then a snapshot is stored in the flash memory. Thus, there is a problem that storage of the snapshot delays by a time period required for the execution of the complete deletion process. In particular, in the case where the user performs an operation of turning off the power supply and then an operation of turning on the power supply in order to use the MFP again, the MFP expands the snapshot into the RAM after executing the complete deletion process and a process of storing the snapshot. Therefore, there is a problem that a time period required for the MFP to become usable is prolonged as compared to the case where the user performs a normal operation of turning on the power supply. Further, the capacitance of the capacitor must be increased in order for a time period during which the CPU is able to operate to be ensured, and there is a problem that the cost is increased.

As a technique for the complete deletion process, Japanese Patent Laid-Open No. 2008-70975 describes a data storage device that stores data as a file, the data storage device including a storage that stores the data, and a controller that controls storage of the data in the storage and deletion of the data from the storage, wherein the controller inspects whether there is a file waiting to be deleted when storing the data, and in the case where there is a file waiting to be deleted, overwrites any one of the files waiting to be deleted with the data.

However, in the case where the user performs the operation of turning off the power supply, the data storage device described in Japanese Patent Laid-Open No. 2008-70975 cannot store a snapshot because the CPU ceases to operate. Even if a time period during which the CPU is able to operate is ensured with use of the capacitor, the process of overwriting the data with the snapshot and the process of deleting the file waiting to be deleted are sometimes concurrently executed. There is a problem that the storage of the snapshot cannot always be completed within the time period that is limited due to the capacitance of the capacitor.

SUMMARY

According to one aspect of the present invention, an image processing apparatus includes a volatile first memory, a non-volatile second memory, a hardware processor that is configured to access the first memory and the second memory, a power supply that supplies power to the first memory, the second memory and the hardware processor, and a delay unit that, in response to generation of a stop trigger for stopping supply of the power by the power supply, delays shut-off of the power supplied to the first memory, the second memory and the hardware processor, wherein the hardware processor loads a program stored in the second memory into the first memory and executes a process defined by the program, after execution of the program ends, deletes data stored in the second memory by execution of the program by overwriting the stored data with predetermined data for complete deletion of the stored data, in response to the generation of the stop trigger for causing the power supply to stop supplying the power, stores data, stored in the first memory, in the second memory as a snapshot, in response to generation of a start trigger for causing the power supply to start supplying the power, transfers the snapshot stored in the second memory to the first memory, and in the case where prospective deletion data that is to be deleted is stored in the second memory in a stage where the stop trigger is generated, overwrites the prospective deletion data with the snapshot without overwriting the prospective deletion data with the predetermined data.

According to another aspect of the present invention, an activation control method performed by a hardware processor that controls an image processing apparatus, the image processing apparatus includes a volatile first memory, a non-volatile second memory, a power supply that supplies power to the first memory, the second memory and the hardware processor, and a delay unit that, in response to generation of a stop trigger for stopping supply of the power by the power supply, delays shut-off of the power supplied to the first memory, the second memory and the hardware processor, and the activation control method causing the hardware processor to perform a process execution step of loading a program stored in the second memory into the first memory and executing a process defined by the program, a complete deletion step of, after execution of the program ends, deleting data stored in the second memory by execution of the program in the process execution step by overwriting the data with predetermined data for complete deletion of the stored data, a snapshot preparation step of, in response to generation of a stop trigger for causing the power supply to stop supplying the power, storing data, stored in the first memory, in the second memory as a snapshot, and an activation step of, in response to generation of a start trigger for causing the power supply to start supplying power, transferring the snapshot stored in the second memory to the first memory, wherein the snapshot preparation step includes a step of, in the case where prospective deletion data to be deleted in the complete deletion step is stored in the second memory in a stage where the stop trigger is generated, stopping deletion of the prospective deletion data and overwriting the prospective deletion data with the snapshot.

According to yet another aspect of the present invention, a non-transitory computer-readable recording medium encoded with an activation control program executed by a hardware processor that controls an image processing apparatus, the image processing apparatus includes a volatile first memory, a non-volatile second memory, and a delay unit that, in response to generation of a stop trigger for stopping supply of power by a power supply, delays shut-off of the power supplied to the first memory, the second memory and the hardware processor, and the activation control program causing the hardware processor to perform a process execution step of loading a program stored in the second memory into the first memory and executing a process defined by the program, a complete deletion step of, after execution of the program ends, deleting data stored in the second memory by execution of the program in the process execution step by overwriting the stored data with predetermined data for complete deletion of the stored data, a snapshot preparation step of, in response to generation of a stop trigger for causing the power supply to stop supplying the power, storing data, stored in the first memory, in the second memory as a snapshot, and an activation step of, in response to generation of a start trigger for causing the power supply to start supplying the power, transferring the snapshot stored in the second memory to the first memory, wherein the snapshot preparation step includes a step of, in the case where prospective deletion data to be deleted in the complete deletion step is stored in the second memory in a stage where the stop trigger is generated, stopping deletion of the prospective deletion data and overwriting the prospective deletion data with the snapshot.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 1 is a perspective view showing the appearance of an MFP in one of embodiments;

FIG. 7 is a flow chart showing one example of a flow of a target data specifying process.

DESCRIPTION OF THE PREFERRED EMBODIMENTS

Figure 2:
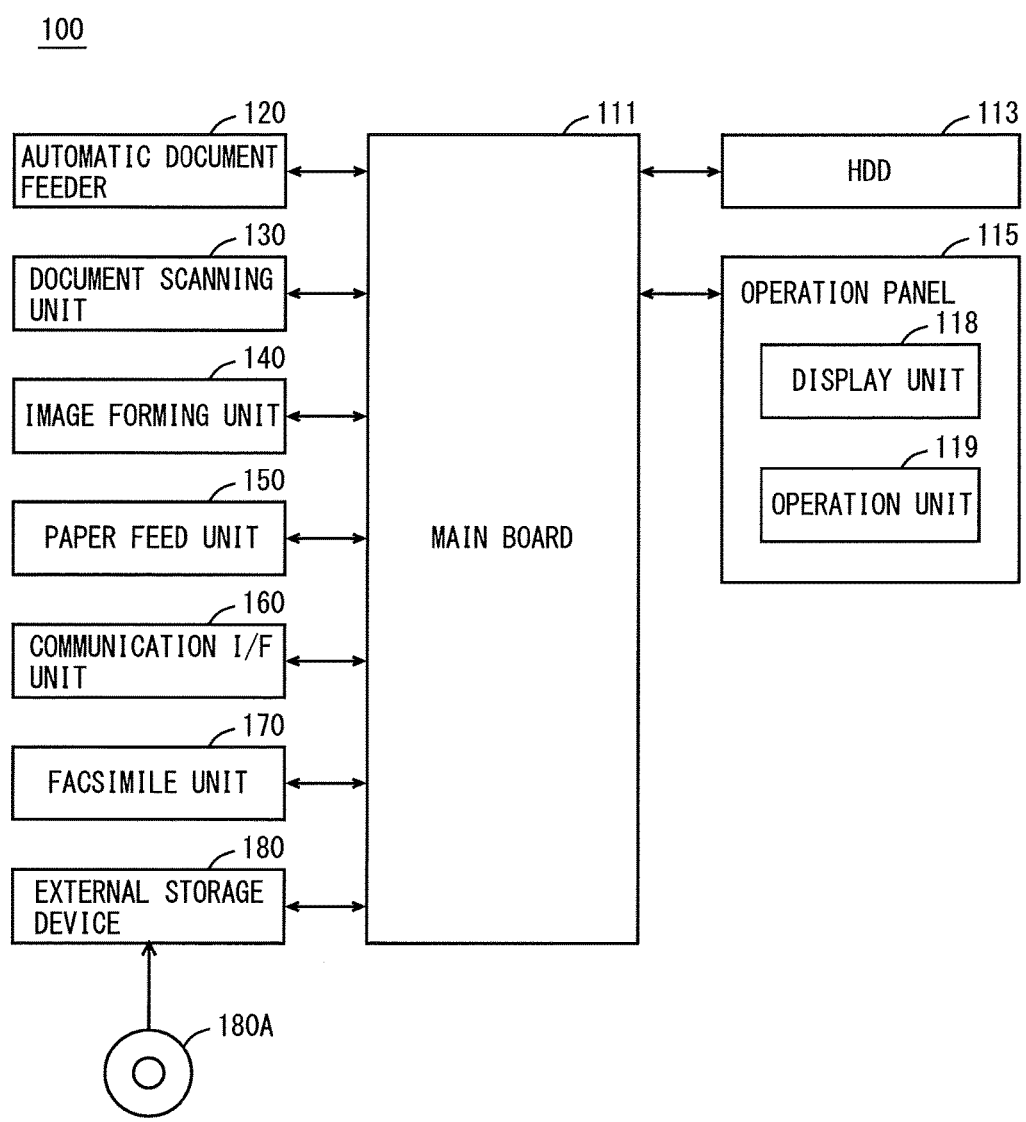
FIG. 2 is a block diagram showing one example of an outline of hardware configurations of the MFP.

Hereinafter, one or more embodiments of the present invention will be described with reference to the drawings. However, the scope of the invention is not limited to the disclosed embodiments.

An embodiment of the present invention will be described below with reference to the drawings. In the following description, the same parts are denoted with the same reference characters. Their names and functions are also the same. Thus, a detailed description thereof will not be repeated.

FIG. 1 is a perspective view showing the appearance of an MFP in one of the embodiments. Referring to FIG. 1, the MFP 100 is one example of an image processing apparatus and includes a document scanning unit 130 for scanning a document, an automatic document feeder 120 for conveying a document to the document scanning unit 130, an image forming unit 140 for forming an image on a sheet of paper or other medium based on image data output by the document scanning unit 130 that has scanned a document, a paper feed unit 150 for supplying sheets of paper to the image forming unit 140 and an operation panel 115 serving as a user interface.

The automatic document feeder 120 automatically transports a plurality of documents set on a document feed tray to a predetermined document scanning position set on a platen glass of the document scanning unit 130 one by one, and discharges the document of which a document image is scanned by the document scanning unit 130 onto a document discharge tray. The document scanning unit 130 includes a light source that irradiates the document that has been transported to the document scanning position with light, and an optoelectronic transducer that receives the light reflected by the document and scans the document image corresponding to a size of the document. The optoelectronic transducer converts the received light into image data, which is an electric signal, and outputs the image data to the image forming unit 140. The paper feed unit 150 has a plurality of paper feed trays. Each of the plurality of paper feed trays stores the sheets of paper of a predetermined size. The paper feed unit 150 takes out sheets of paper from a paper feed tray that stores sheets of paper of a size used for image formation among the plurality of paper feed trays one by one, and transports the taken sheet of paper to the image forming unit 140.

The image forming unit 140 forms an image by a well-known electrophotographic method, and forms an image on the paper transported by the paper feed unit 150 based on image data on which a data process has been performed or image data that has been externally received. The data process includes various data processes such as shading correction performed on the image data received from the document scanning unit 130. The MFP 100 has a front door 140A, which can be closed and opened, at a front surface of the image forming unit 140. The image forming unit 140 is exposed to the outside when the front door 140A is opened.

The operation panel 115 is provided on an upper surface of the MFP 100, displays an operation screen and the like, and functions as the user interface that accepts an operation by a user.

FIG. 2 is a block diagram showing one example of an outline of hardware configurations of the MFP. Referring to FIG. 2, the MFP 100 includes a main board 111, a communication interface (I/F) unit 160, a facsimile unit 170, an external storage device 180, a hard disk drive (HDD) 113 used as a mass storage device and the operation panel 115 in addition to the automatic document feeder 120, the document scanning unit 130, the image forming unit 140 and the paper feed unit 150 that are described above.

The main board 111 is connected to the automatic document feeder 120, the document scanning unit 130, the image forming unit 140, the paper feed unit 150, the communication I/F unit 160, the facsimile unit 170, an external storage device 115, the HDD 113 and the operation panel 115.

The communication I/F unit 160 is an interface for connecting the MFP 100 to a network. The communication I/F unit 160 communicates with another computer connected to the network by a communication protocol such as a TCP (Transmission Control Protocol) or a UDP (User Datagram Protocol). The protocol for communication is not limited in particular, and any protocol can be used. Further, the network to which the communication I/F unit 160 is connected is, for example, a local area network (LAN) and either wired or wireless. The network is not limited to the LAN but may be a wide area network (WAN), a network using the Public Switched Telephone Networks or other networks. Further, the network is connected to the Internet. The MFP 100 therefore can communicate with a computer such as a server connected to the Internet.

The communication I/F unit 160 outputs data received from the network to the main board 111 and outputs data received from the main board 111 to the network. The communication I/F unit 160 outputs only the data, addressed to MFP 100 among the data received from the network, to the main board 111 and discards the data addressed to a device different from MFP 100 among the data received from the network. Further, in the case where receiving the data, which is addressed to MFP 100 and inquires about a domain name, a MAC address, an IP address and the like, among the data received from the network, the communication I/F unit 160 returns a response without outputting the data to the main board 111. The data for inquiring the MAC address is, for example, the data in accordance with ARP (Address Resolution Protocol) standards.

The facsimile unit 170 is connected to the Public Switched Telephone Networks (PSTN) to transmit and receive facsimile data. A CD-ROM (Compact Disk Read Only Memory) 180A or a semiconductor memory is mounted on the external storage device 180. The external storage device 180 reads out the data stored in the CD-ROM 180A or the semiconductor memory. The external storage device 180 stores data in the CD-ROM 180A or the semiconductor memory.

The operation panel 115 includes a display unit 118 and an operation unit 119. The display unit 118 is, for example, a liquid crystal display (LCD) and displays instruction menus to users, information about the acquired image data and other data. The operation unit 119 includes a plurality of hard keys and a touch panel. The touch panel is a multi-touch-supporting touch panel provided on an upper surface or a lower surface of the display unit 118 in a superimposed manner and detects a position designated by the user in the display surface of the display unit 118.

Figure 3:
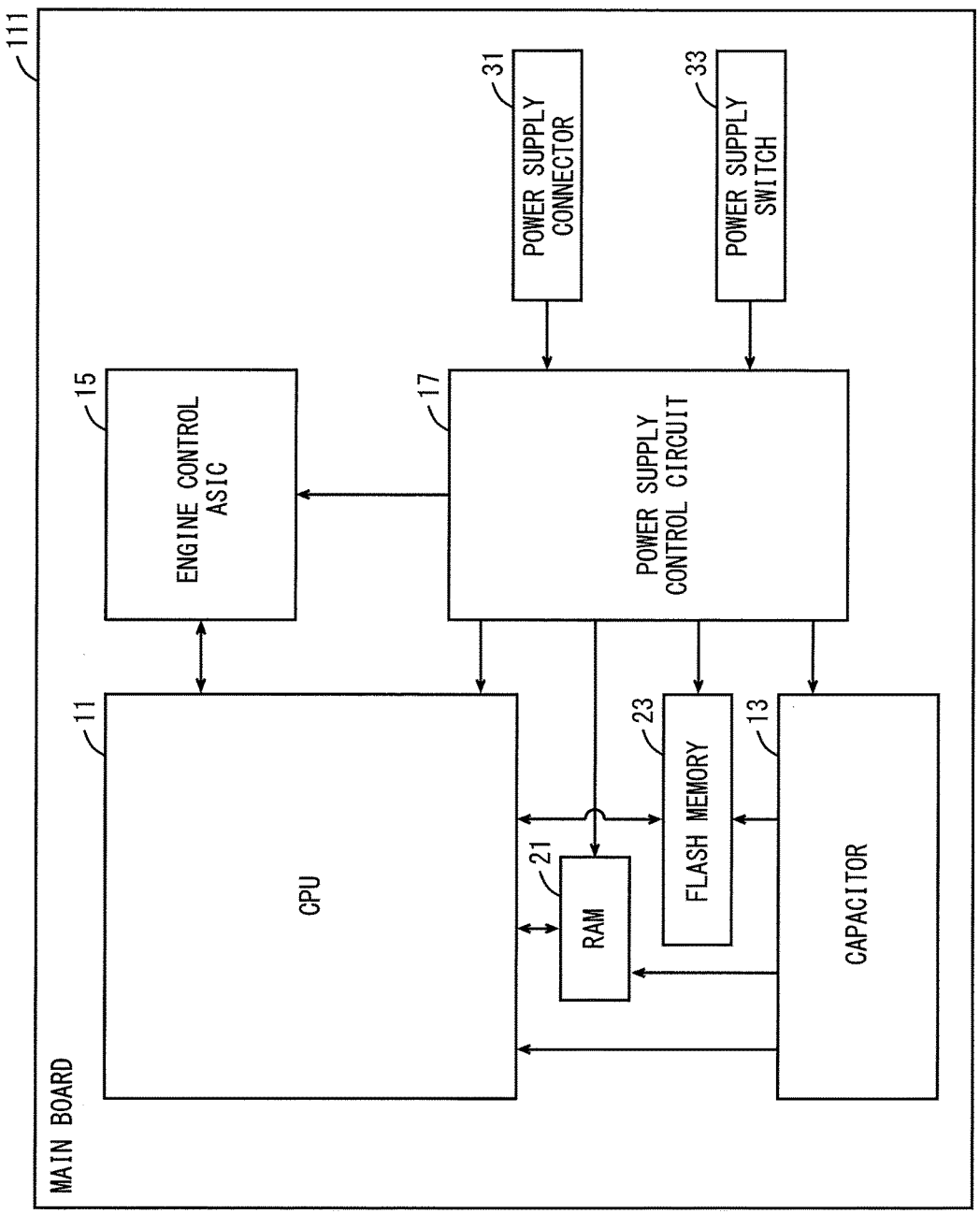
FIG. 3 is a block diagram showing one example of a detailed configuration of a main board.

FIG. 3 is a block diagram showing one example of a detailed configuration of the main board. Referring to FIG. 3, the main board 111 includes a CPU 11, a capacitor 13, an engine control ASIC (Application Specific Integrated Circuit) 15, a power supply control circuit 17, a RAM 21 and a flash memory 23.

The power supply control circuit 17 is connected to a commercial power supply via a power supply connector 31 and is connected to a power supply switch 33. The power supply switch 33 is operated by a user and switches the power supply control circuit 17 between an ON state and an OFF state. In the ON state, the power supply control circuit 17 supplies the power supplied from the commercial power supply to the CPU 11, the engine control ASIC 15, the capacitor 13, the RAM 21 and the flash memory 23. In the OFF state, the power supply control circuit 17 does not supply the power to the CPU 11, the capacitor 13, the engine control ASIC 15, the RAM 21 and the flash memory 23.

The capacitor 13 is connected to the power supply control circuit 17, the CPU 11, the RAM 21 and the flash memory 23. The capacitor 13 stores the power supplied from the power supply control circuit 17. When the supply of the power from the power supply control circuit 17 is stopped, the capacitor 13 discharges the power that has been stored till then and supplies the power to the CPU 11, the RAM 21 and the flash memory 23. The capacitor 13, the power supply control circuit 17, the CPU 11, the RAM 21 and the flash memory 23 constitute a delay circuit that delays the shut-off of the power supplied to the CPU 11, the RAM 21 and the flash memory 23 in response to the switch of the power supply control circuit 17 to the OFF state.

The RAM 21 is a volatile semiconductor memory used as a work area of the CPU 11. The flash memory 23 is a non-volatile semiconductor memory controlled by the CPU 11.

The CPU 11 can access the flash memory 23 and processes the data stored in the flash memory 23 by using a predetermined system. The process of data includes writing, reading out and moving the data, changing the name of the file and the like. As for the system, which the CPU 11 uses for the process of the data stored in the flash memory 23, FAT 32 (File Allocation Table 32), NTFS (NT File System), EXT2/3, HFS (Hierarchical File System), HFS+ and the like can be used, for example. Here, the CPU 11 divides a storage region of the flash memory 23 into sectors, which are minimum units of data, and stores one file in one or more sectors. The file includes a program executable by the CPU 11 and the data produced in the case where the CPU 11 executes the program.

The engine control ASIC 15 is connected to the automatic document feeder 120, the document scanning unit 130, the image forming unit 140 and the paper feed unit 150 and controls them. Further, the engine control ASIC 15 has a function of performing a predetermined imaging process on image data output by the document scanning unit 130 that has scanned a document, and a function of converting the image data into raster data for printing by the image forming unit 140.

Figure 4:
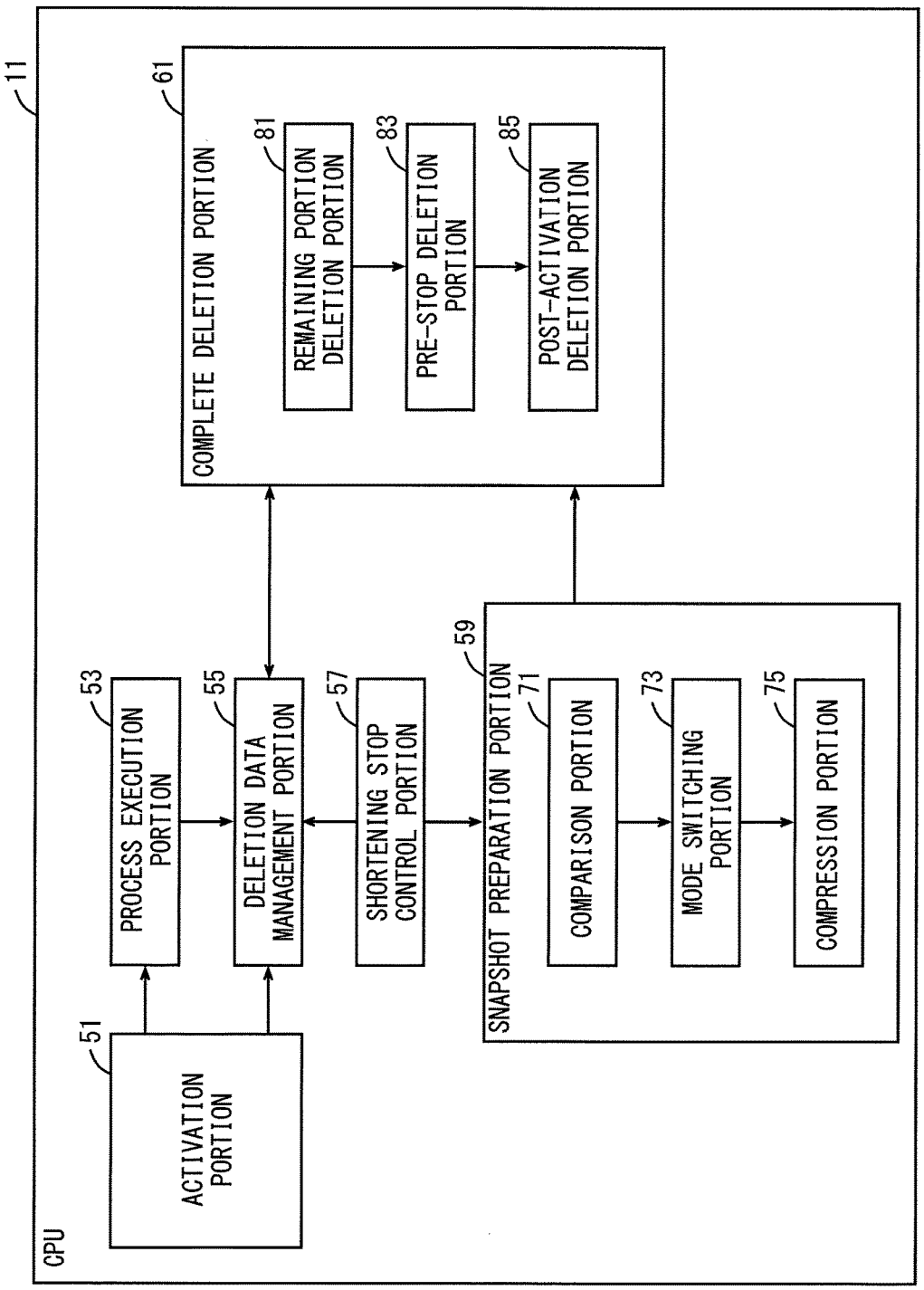
FIG. 4 is a block diagram showing one example of functions of a CPU.

FIG. 4 is a block diagram showing one example of functions of the CPU. The functions shown in FIG. 4 are formed in the CPU 11 in the case where the CPU 11 executes an activation control program and a process execution program stored in the flash memory 23. Referring to FIG. 4, the CPU 11 includes an activation portion 51, a process execution portion 53, a deletion data management portion 55, a shortening stop control portion 57, a snapshot preparation portion 59, and a complete deletion portion 61.

The process execution portion 53 loads the process execution program stored in the flash memory 23 into the RAM 21 for execution. The process execution program includes a facsimile transmission program for transmitting facsimile data, a facsimile reception program for receiving facsimile data, a print program for receiving a print job and forming an image based on the received print job, and a document scanning program for controlling the document scanning unit 130 and scanning a document. Further, the process execution program may include a maintenance program for managing consumables included in the MFP 100 and an error state notification program for making notification of an error state. The processes executable by the process execution portion 53 are not limited to these.

When executing a process, the process execution portion 53 sometimes temporarily stores the data to be processed in the flash memory 23. Then, after the process is completed, the process execution portion 53 sometimes deletes the temporary data that is temporarily stored as a process target. For example, in the case where executing a facsimile transmission process by executing the facsimile transmission program, the process execution portion 53 sometimes converts the data into facsimile data as the temporary data, stores the data in the flash memory 23 and transmits the stored facsimile data. Further, in the case where executing a print process by executing the print program, the process execution portion 53 sometimes stores an externally received print job in the flash memory 23 as the temporary data and allows the image forming unit 140 to form an image of the print data included in the stored print job. Further, in the case where executing a document scanning process by executing the document scanning program, the process execution portion 53 sometimes stores the image data, output by the document scanning unit 130 that has scanned a document, in the flash memory 23 as the temporary data, and converts the stored image data into a predetermined format. Further, in the case where executing the document scanning program, the process execution portion 53 stores the image data, output by the document scanning unit 130 that has scanned a document, in the flash memory 23 as the temporary data and allows the image forming unit 140 to form an image of the image data stored as the temporary data on a sheet of paper. When executing a process, the process execution portion 53 stores the data to be processed in the flash memory 23 as the temporary data. The process execution portion 53 requests the deletion data management portion 55 to delete the temporary data after the process is completed.

When being requested to delete the temporary data by the process execution portion 53, the deletion data management portion 55 outputs a deletion instruction for deleting the requested temporary data to the complete deletion portion 61. The deletion instruction includes data identification information for identifying the temporary data. In response to reception of the deletion instruction, the complete deletion portion 61 completely deletes the temporary data specified by the data identification information included in the deletion instruction. Specifically, the complete deletion portion 61 overwrites all of one or more sectors in which the temporary data is stored with predetermined data, that is, "0" (zero-data), for example.

The complete deletion of the temporary data by the complete deletion portion 61 requires a predetermined time period. Therefore, before the complete deletion of the temporary data by the complete deletion portion 61 is completed since the deletion instruction is output to the complete deletion portion 61, the deletion data management portion 55 is sometimes requested to delete another temporary data by the process execution portion 53. In this case, at a time point at which the deletion of the other temporary data is requested by the process execution portion 53, the deletion data management portion 55 adds the other temporary data to the deletion waiting data list. Then, after the deletion of the temporary data by the complete deletion portion 61 ends, the deletion data management portion 55 requests the complete deletion portion 61 to delete the temporary data that has been added to the deletion waiting data list. The deletion waiting data list is stored in a predetermined region of the flash memory 23.

Specifically, the deletion data management portion 55 adds the data identification information, for identifying the temporary data to be deleted, that is, the name of the file, for example, to the deletion waiting data list stored in the flash memory 23. At a time point at which the deletion of the temporary data by the complete deletion portion 61 is completed after the deletion instruction is output to the complete deletion portion 61, the deletion data management portion 55 deletes the data identification information of the temporary data that has been deleted from the deletion waiting data list. In the case where the deletion waiting data list includes another data identification information, the deletion data management portion 55 outputs a deletion instruction including the other data identification information to the complete deletion portion 61. The deletion data management portion 55 outputs a deletion instruction to the complete deletion portion 61 until the deletion waiting data list no longer includes data identification information. Hereinafter, the data identified by the data identification information included in the deletion waiting data list is referred to as deletion waiting data.

Further, after being requested to delete the temporary data by the process execution portion 52, the deletion data management portion 55 may output a deletion instruction to the complete deletion portion 61 in the case where the process has not been executed by the process execution portion 53. It is possible not to let the process executed by the process execution portion 53 and the process of completely deleting the temporary data by the complete deletion portion 61 be carried out concurrently, and to allow the process execution portion 53 to be given priority to execute the process over the complete deletion portion 61. Thus, a time period required to complete the process executed by the process execution portion 53 can be reduced as much as possible, and a waiting time period for the user can be reduced.

In response to the switch of the power supply control circuit 17 from the ON state to the OFF state, the shortening stop control portion 57 stops the deletion of the deletion waiting data and stores a snapshot in the flash memory 23. Specifically, in response to the switch of the power supply control circuit 17 to the OFF state by an operation of the power supply switch 33 by the user, the shortening stop control portion 57 outputs a stop signal to the deletion data management portion 55 and outputs a production instruction to the snapshot preparation portion 59. After receiving the stop signal, the deletion data management portion 55 does not output a deletion instruction to the complete deletion portion 61.

In response to the reception of the production instruction from the shortening stop control portion 57, the snapshot preparation portion 59 stores a snapshot in the flash memory 23. The snapshot is operation environment information of the MFP 100 at a current time point and all of the data stored in the RAM 21. Specifically, the snapshot includes operation information such as the data of one or more execution programs, loaded into the RAM 21 by the CPU 11, of the plurality of programs stored in the flash memory 23, contents of registers, a state of an operation system and a counter value. Therefore, the contents of the snapshot differ depending on a process under execution by the process execution portion 53, hardware resources attached to the MFP 100 and the like. The hardware resources include the operation panel 115, the facsimile unit 170, the communication I/F unit 160, the HDD 113, the external storage device 180 and the engine control ASIC 15. Further, the snapshot may include information of a screen being displayed in the display unit 118 at a current time point. Further, the snapshot may include the data stored in the HDD 113 and the flash memory 23.

In the case where the deletion waiting data list is stored in the flash memory 23, the snapshot preparation portion 59 specifies one deletion waiting data as the target data with reference to the deletion waiting data list, and stores a snapshot in the flash memory by overwriting the deletion waiting data specified as the target data with the snapshot.

The snapshot preparation portion 59 includes a comparison portion 71, a mode switching portion 73 and a compression portion 75. The comparison portion 71 estimates a size of the snapshot. The size of the snapshot depends on the hardware resources attached to the MFP 100. This is because the snapshot includes a portion, loaded into the RAM 21, of the driver program for controlling the hardware resources. Therefore, the size of the snapshot is estimated based on the hardware resources attached to the MFP 100. The size of the snapshot in the case where a corresponding driver program is loaded into the RAM 21 may be determined in advance for each of the hardware resources. The snapshot preparation portion 59 may specify the snapshot stored in the RAM 21 and may determine its size.

The comparison portion 71 specifies the deletion waiting data having a size larger than the estimated size of the snapshot and closest to the estimated size of the snapshot as the target data from among the one or more pieces of deletion waiting data defined by the deletion waiting data list. In the case where the deletion waiting data having a size larger than the estimated size of the snapshot is not present among the one or more pieces of deletion waiting data defined by the deletion waiting data list, the comparison portion 71 specifies the deletion waiting data having the largest size as the target data. The comparison portion 71 outputs the data identification information of the deletion waiting data specified as the target data to the mode switching portion 73.

The mode switching portion 73 switches a storage mode to either a compression mode or a non-compression mode. In the case where the estimated size of the snapshot is equal to or smaller than the size of the deletion waiting data specified as the target data, the mode switching portion 73 switches the storage mode to the non-compression mode. In the case where the estimated size of the snapshot is larger than the size of the temporary data specified as the target data, the mode switching portion 73 switches the storage mode to the compression mode and outputs a compression instruction to the compression portion 75.

In the case where switching the storage mode the compression mode, the mode switching portion 73 outputs the compression instruction to the compression portion 75. The compression instruction includes a minimum compression rate at which the estimated size of the snapshot is equal to or smaller than the size of the specified deletion waiting data. The compression rate is a value resulting from division of the size of the deletion waiting data specified as the target data by the estimated size of the snapshot.

In the case where receiving the compression instruction from the mode switching portion 73, the compression portion 75 determines a compression format based on a compression rate included in the compression instruction. For example, the compression portion 75 selects a compression format having a compression rate closest to the compression rate included in the compression instruction from among the plurality of compression formats prepared in advance. Further, because time periods required for the compression process differ depending on the compression formats, the compression portion 75 may select a compression format, which enables the compression rate included in the compression instruction to be achieved and requires a shortest time period for the compression process. It is possible to reduce a total time period required to complete the storage of the snapshot by reducing the time period required for the compression process as much as possible.

In the case where the storage mode is switched to the non-compression mode by the mode switching portion 73, the snapshot preparation portion 59 stores a snapshot in the flash memory 23 by overwriting the deletion waiting data specified as the target data with the snapshot stored in the RAM 21. In response to completion of the storage of the snapshot, the snapshot preparation portion 59 deletes the data identification information of the deletion waiting data specified as the target data from the deletion waiting data list. Further, the snapshot preparation portion 59 rewrites the address information of the snapshot defined by a boot program with the address information of the snapshot stored in the flash memory 23.

In the case where the storage mode is switched to the non-compression mode, the size of the snapshot is smaller than the size of the temporary data specified as the target data. Therefore, the snapshot preparation portion 59 outputs a remaining portion deletion instruction for deleting a portion, which has not been overwritten with the snapshot, of the deletion waiting data specified as the target data to the complete deletion portion 61. The remaining portion deletion instruction includes sector numbers of a plurality of sectors in which the deletion waiting data specified as the target data is stored, and sector numbers for identifying the sector that follows the sector in which the snapshot is last stored, for example.

In the case where the storage mode is switched to the compression mode by the mode switching portion 73, the snapshot preparation portion 59 stores a snapshot in the flash memory 23 by overwriting the deletion waiting data specified as the target data with the compressed snapshot stored in the RAM 21. In response to completion of the storage of the snapshot, the snapshot preparation portion 59 deletes the data identification information of the deletion waiting data specified as the target data from the deletion waiting data list. Further, the snapshot preparation portion 59 rewrites the address information of the snapshot defined by the boot program with the address information of the snapshot stored in the flash memory.

In the case where the storage mode is switched to the compression mode, the size of the compressed snapshot is smaller than the size of the temporary data specified as the target data. Thus, the snapshot preparation portion 59 outputs the remaining portion deletion instruction for deleting a portion, which has not been overwritten with the compressed snapshot, of the deletion waiting data specified as the target data to the complete deletion portion 61. The remaining portion deletion instruction includes sector numbers of a plurality of sectors in which the deletion waiting data specified as the target data has been stored, and sector numbers for identifying the sector that follows the sector in which the compressed snapshot is last stored, for example.

The complete deletion portion 61 includes a remaining portion deletion portion 81, a pre-stop deletion portion 83 and a post-activation deletion portion 85. In response to reception of the remaining portion deletion instruction from the snapshot preparation portion 59, the remaining portion deletion portion 81 deletes a remaining portion, which has not been overwritten with a snapshot or the compressed snapshot, of the deletion waiting data specified as the target data. Specifically, the complete deletion portion 61 overwrites each of all sectors including a sector specified by a sector number included in the remaining portion deletion instruction and a sector in which a code indicating the end of file is stored, with "0", for example. When the deletion of the remaining portion is completed, the remaining portion deletion portion 81 outputs a deletion instruction to the pre-stop deletion portion 83.

In response to reception of the deletion instruction from the remaining portion deletion portion 81, the pre-stop deletion portion 83 makes reference to the deletion waiting data list stored in the flash memory 23. In the case where the deletion waiting data list includes one or more pieces of data identification information, the pre-stop deletion portion 83 selects one or more pieces of the data identification information in order and completely deletes the deletion waiting data specified by the selected data identification information. Specifically, the pre-stop deletion portion 83 overwrites all of one or more sectors in which the deletion waiting data is stored with predetermined data, that is, "0", for example.

In response to supply of power to the CPU 11 and reception of a reset signal, the activation portion 51 reads out the snapshot stored in the flash memory 23 from the flash memory 23 and stores the read snapshot in the RAM 21. After storing the snapshot in the RAM 21, the activation portion 51 outputs an activation completion signal to the process execution portion 53 and the deletion data management portion 55. Specifically, when receiving the reset signal, the CPU 11 executes the boot program stored in the flash memory 23. This boot program defines the address information indicating a position of the snapshot. The address information of the snapshot defined by the boot program is overwritten by the snapshot preparation portion 59. The activation portion 51 reads out a snapshot specified by the address information defined by the boot program from the flash memory 23 and stores it in the RAM 21. Thus, the snapshot is stored in the RAM 21 as an execution program, so that the CPU 11 can execute an execution program.

During a period in which the pre-stop deletion portion 83 is completely deleting the temporary data, the supply of power to the CPU 11 from the capacitor 13 is sometimes stopped. In this case, with the deletion waiting data list including one or more pieces of data identification information, the CPU 11 ceases to operate. In response to reception of the activation completion signal from the activation portion 51, the deletion data management portion 55 makes reference to the deletion waiting data stored in the flash memory 23. In the case where the deletion waiting data list includes one or more pieces of data identification information, the deletion data management portion 55 outputs an at-activation deletion instruction to the complete deletion portion 61.

In response to reception of the at-activation deletion instruction from the deletion data management portion 55, the post-activation deletion portion 85 makes reference to the deletion waiting data list stored in the flash memory 23, selects one or more pieces of the data identification information included in the deletion waiting data list in order, and completely deletes the deletion waiting data specified by the selected data identification information. Specifically, the post-activation deletion portion 85 overwrites all of the one or more sectors in which the deletion waiting data is stored with predetermined data, that is, "0", for example.

Figure 5:
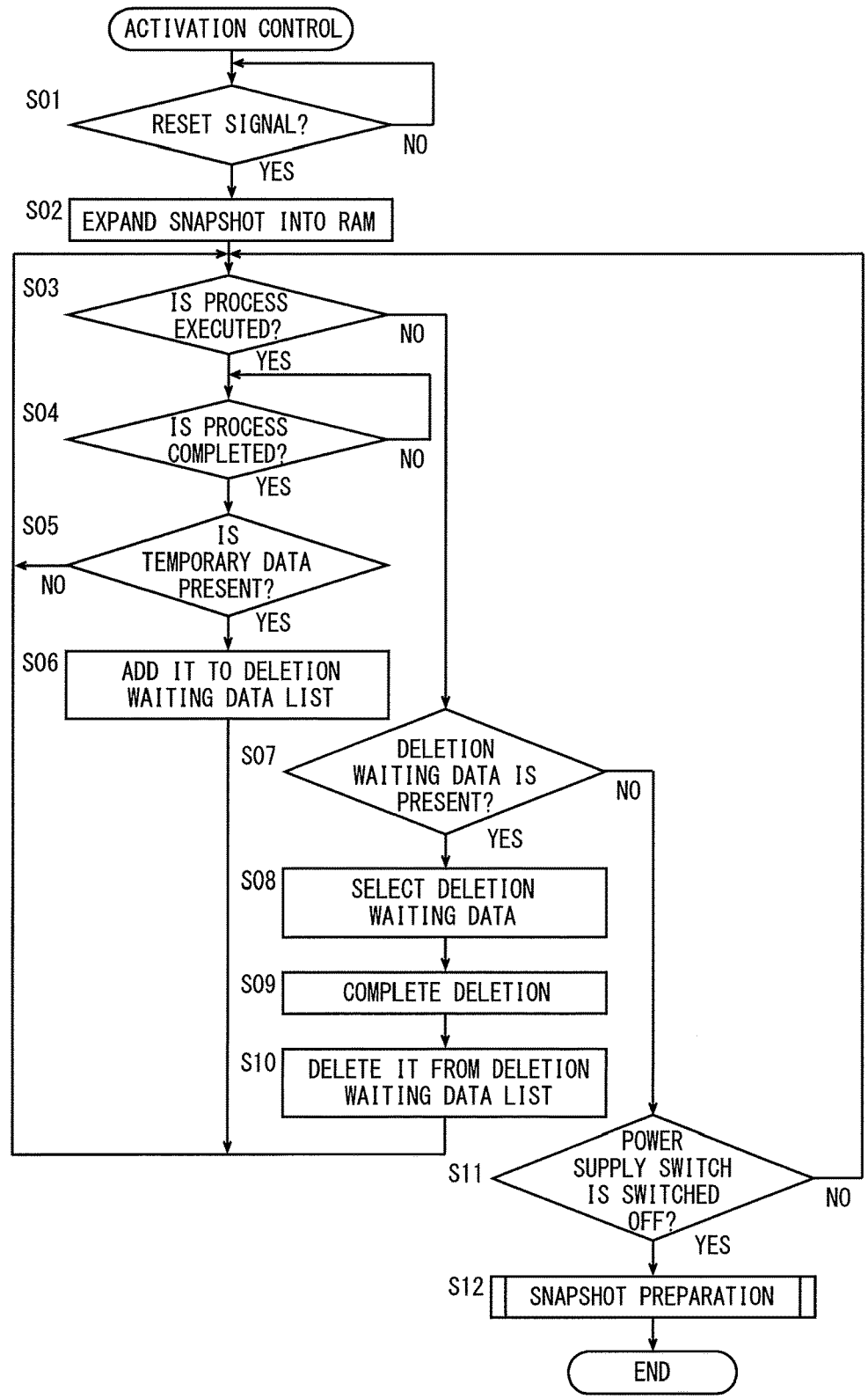
FIG. 5 is a flow chart showing one example of a flow of an activation control process.

FIG. 5 is a flow chart showing one example of a flow of an activation control process. The activation control process is a process executed by the CPU 11 in the case where the CPU 11 executes the activation control program. Referring to FIG. 5, the CPU 11 receives a reset signal (step S01). Here, in the case where the power supply switch 33 is switched to ON, a reset terminal of the CPU 11 receives the reset signal. The CPU 11 is in a waiting state until receiving the reset signal. When receiving the reset signal, the CPU 11 executes the boot program, and the process proceeds to the step S02.

In the step S02, the CPU 11 expands a snapshot stored in the flash memory 23 into the RAM 21. Specifically, the CPU 11 reads out the snapshot stored in the flash memory 23 by using the address information defined by the boot program and stores it in the RAM 21.

In the step S03, the CPU 11 determines whether the process has been executed based on an instruction of the user. For example, the CPU 11 determines which one of the facsimile transmission process, the print process and the document scanning process has been executed. The process is not limited to these as long as being executable by the MFP 100. If the MFP 100 has executed one of the executable processes, the process proceeds to the step S04. If not, the process proceeds to the step S07.

In the step S04, the CPU 11 determines whether the process executed in the step S03 has been completed. The activation control process waits until the process is completed. If the process is completed, the activation control process proceeds to the step S05. In the step S05, the CPU 11 determines whether temporary data is stored in the flash memory 23 by the execution of the process. If the temporary data is stored in the flash memory 23, the CPU 11 specifies the temporary data, and the process proceeds to the step S06. If not, the process returns to the step S03. In the step S06, the temporary data is added to the deletion waiting data, and the process returns to the step S03. Specifically, the CPU 11 adds the data identification information of the temporary data specified in the step S05 to the deletion waiting list stored in the flash memory 23.

In the step S07, the CPU 11 determines whether the deletion waiting list is present. If the deletion waiting data list stored in the flash memory 23 includes one or more pieces of data identification information, it is determined that the deletion waiting data is present, and the process proceeds to the step S08. If not, the process proceeds to the step S11. In the step S08, the CPU 11 selects the deletion waiting data that is to be processed. The CPU 11 selects one of the one or more pieces of the data identification information included in the deletion waiting data list as the process target. Then, the CPU 11 completely deletes the deletion waiting data specified by the selected data identification information (step S09), and the process proceeds to the step S10. In the step S10, the CPU 11 deletes the data identification information of the deletion waiting data that has been completely deleted from the deletion waiting data list, and the process returns to the step S03.

In the step S11, it is determined whether the power supply switch has been switched to OFF. If the power supply switch has been switched to OFF, the process proceeds to the step S12. If not, the process returns to the step S03. In the case where the power supply switch is switched to OFF, the supply of power to the CPU 11 from the power supply control circuit 17 is stopped. However, the power is supplied from the capacitor 13, so that the CPU 11 can execute the process of the step S12 and the subsequent steps. In the step S12, a snapshot preparation process is executed, and the process ends.

Figure 6:
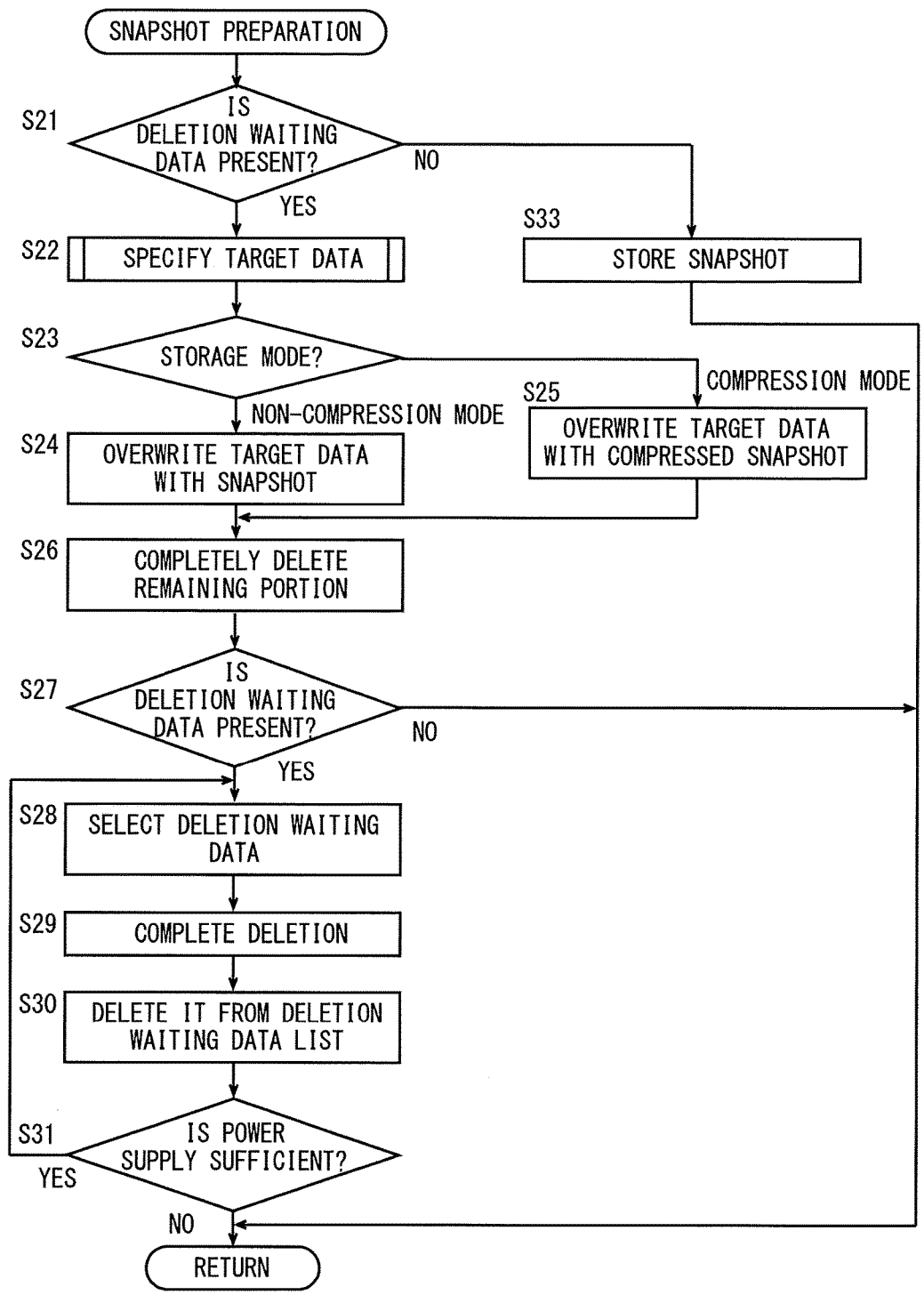
FIG. 6 is a flow chart showing one example of a flow of a snapshot preparation process.

FIG. 6 is a flow chart showing one example of a flow of the snapshot preparation process. Referring to FIG. 6, the CPU 11 determines whether the deletion waiting data is present (step S21). If the deletion waiting data list stored in the flash memory 23 includes one or more pieces of data identification information, the CPU 11 determines that the deletion waiting data is present, and the process proceeds to the step S22. If not, the process proceeds to the step S33. In the step S33, the data stored in the RAM 21 is stored in the flash memory 23 as a snapshot, and the process returns to the activation control process.

In the step S22, the CPU 11 executes a target data specifying process, and the process proceeds to the step S23. While the details of the target data specifying process are described below, the target data specifying process is a process of specifying one piece of the one or more pieces of deletion waiting data as target data, and determines a storage mode. In the step S23, the process branches according to the storage mode. If the storage mode is set to the non-compression mode, the process proceeds to the step S24. If the storage mode is set to the compression mode, the process proceeds to the step S25. In the step S24, the target data is overwritten with a snapshot, and the process proceeds to the step S26. In the step S25, the target data is overwritten with the compressed snapshot, and the process proceeds to the step S26. In the step S26, a remaining portion is completely deleted, and the process proceeds to the step S27. The remaining portion is a portion, which has not been overwritten with the snapshot or the compressed snapshot, of the target data.

In the step S27, the CPU 11 determines whether the deletion waiting data is present. If the deletion waiting data list stored in the flash memory 23 includes one or more pieces of data identification information, it is determined that the deletion waiting data is present, and the process proceeds to the step S28. If not, the process ends. In the step S28, the CPU 11 selects the deletion waiting data to be processed. The CPU 11 selects one of the one or more pieces of the data identification information included in the deletion waiting data list as a process target. Then, the deletion waiting data specified by the selected data identification information is completely deleted (step S29), and the process proceeds to the step S30. In the step S30, the CPU 11 deletes the data identification information of the deletion waiting data that has been completely deleted from the deletion waiting data list, and the process proceeds to the step S31.

In the next step S31, the CPU 11 determines whether the power supply is sufficient. If an amount of power stored in the capacitor 13 is sufficient, the process returns to the step S28. If not, the process returns to the activation control process. For example, the CPU 11 measures an output voltage of the capacitor 13, and estimates an amount of power stored in the capacitor 13 from the output voltage.

FIG. 7 is a flow chart showing one example of a flow of the target data specifying process. The target data specifying process is a process executed in the step S22 of the snapshot preparation process. Referring to FIG. 7, the size of the snapshot stored in the RAM 21 is estimated in the step S41. The size of the snapshot is estimated based on the hardware resources attached to the MFP 100. The size of the snapshot in the case where the corresponding driver program is loaded into the RAM 21 may be defined in advance for each of the hardware resources. In the next step S42, the CPU 11 determines whether optimum deletion waiting data is present. The size of the optimum deletion waiting data is larger than the estimated size of the snapshot and closest to the size of the estimated snapshot. If the optimum deletion waiting data is present in the one or more pieces of the deletion waiting data defined by the deletion waiting data list, the process proceeds to the step S43. If not, the process proceeds to the step S45. In the step S43, the storage mode is set to the non-compression mode, and the process proceeds to the step S44. In the step S44, the optimum deletion waiting data of the one or more pieces of deletion waiting data defined by the deletion waiting data list is set as the target data, and the process returns to the activation control process.

In the step S45, the storage mode is set to the compression mode, and the process proceeds to the step S46. In the step S46, the CPU 11 specifies the deletion waiting data having the largest size among the one or more pieces of the deletion waiting data defined by the deletion waiting data list. Then, the specified deletion waiting data is set as the target data (step S47), and the process proceeds to the step S48. In the step S48, a compression rate is calculated. The compression rate is calculated by division of the size of the target data by the size of the snapshot estimated in the step S41.

In the next step S49, a compression format is determined based on the compression rate, and the process proceeds to the step S50. The CPU 11 selects a compression format suitable for the compression at the compression rate among a plurality of predetermined compression formats. For example, the compression format having a compression rate closest to the compression rate included in the compression instruction is selected from among the plurality of compression formats prepared in advance. Further, because time periods required for the compression process differ depending on the compression formats, the CPU 11 may select the compression format, which enables the compression rate included in the compression instruction to be achieved and requires a shortest time period for the compression process. It is possible to reduce the total time period required for the storage of the snapshot to be completed by reducing a time period required for the compression process as much as possible. In the step S50, the snapshot is compressed in the compression format determined in the step S49, and the process returns to the activation control process.

As described above, in the MFP 100 in the present embodiment, when the power supply switch 33 is switched to OFF by the user, the power supply control circuit 17 stops the supply of power. However, the capacitor 13 discharges the power, so that the shut-off of the power supplied to the CPU 11, the RAM 21 and the flash memory 23 is delayed. A delay time period is defined by the capacitance of the capacitor 13. The CPU 11 loads a program stored in the flash memory 23 into the RAM 21 and executes a process defined by the program, and deletes the temporary data stored in the flash memory 23 by the execution of the program by overwriting the temporary data with predetermined data after the execution of the program ends. Further, in response to the switch of the power supply switch 33 to OFF by the user, the CPU 11 stores the data stored in the RAM 21 in the flash memory 23 as a snapshot. Then, in response to the switch of the power supply switch 33 to ON by the user, the CPU 11 transfers the snapshot stored in the flash memory 23 to the RAM 21, so that a time period required for the CPU 11 to be ready to operate can be reduced. Further, in the case where the temporary data stored in the flash memory 23 by the execution of the program is not deleted and stored in the flash memory 23 as the deletion waiting data in a stage where the power supply switch 33 is switched to OFF by the user, the CPU 11 stops the deletion of prospective deletion data and overwrites the deletion waiting data with a snapshot. Therefore, the prospective deletion data can be deleted simultaneously with the storage of the snapshot. Further, because the storage of the snapshot is given priority over the deletion of the prospective deletion data, a time period from the time when the power supply switch 33 is switched to OFF by the user until the time when the storage of the snapshot is completed can be reduced. As a result, it is possible to reduce a time period required until the power supply is stopped, and a time period from the time when the power is supplied until the time when the CPU 11 is ready to be operate.

Further, the CPU 11 can determine the prospective deletion data having a size suitable for the size of the snapshot from among a plurality of pieces of prospective deletion data by comparing the size of the snapshot to the size of the prospective deletion data. Therefore, the prospective deletion data that is overwritten with the snapshot can be efficiently deleted.

Further, in the case where the size of the snapshot is larger than the size of the prospective deletion data, the CPU 11 compresses the snapshot for storage. In the case where the size of the snapshot is equal to or smaller than the size of the prospective deletion data, the CPU 11 stores the snapshot without compressing it. Therefore, the prospective deletion data is overwritten with the snapshot having a size smaller than the size of the prospective deletion data or the compressed snapshot, so that the prospective deletion data that is overwritten with the snapshot can be efficiently deleted.

Further, in the case where the size of the snapshot is smaller than the size of the prospective deletion data, the CPU 11 deletes a portion, which has not been overwritten with the snapshot, of the prospective deletion data by overwriting the portion with predetermined data. Therefore, the prospective deletion data is reliably deleted, so that the security can be maintained.

Further, in the case where the prospective deletion data is stored in the flash memory 23 after the storage of a snapshot is completed, the CPU 11 deletes the prospective deletion data stored in the flash memory 23 by overwriting it with the predetermined data. Therefore, the prospective deletion data is reliably deleted, so that the security can be maintained.

Further, after the power supply switch 33 is switched to OFF by the user, the CPU 11 adds the prospective deletion data identification information for identifying the prospective deletion data to the deletion waiting list stored in the flash memory 23. In the case where the prospective deletion data identification information is included in the deletion waiting list after the power supply switch 33 is switched to ON, the CPU 11 overwrites the prospective deletion data identified by the prospective deletion data identification information with predetermined data. Therefore, the deletion waiting data, which could not have been deleted within a time period by which the shut-off of the supply of power is delayed by the capacitor 13, can be deleted after the next activation. Therefore, the prospective deletion data is reliably deleted, so that the security can be maintained.

In the present embodiment, a delay circuit, for delaying the shut-off of the power supplied to the CPU 11, the RAM 21 and the flash memory 23 in response to the switch of the power supply control circuit 17 to the OFF state, is constituted by the capacitor 13, the power supply control circuit 17, the CPU 11, the RAM 21 and the flash memory 23. The power supply control circuit 17 may shut off the power supplied to the CPU 11, the RAM 21 and the flash memory 23 after a predetermined time period has elapsed since the power supply switch 33 is switched from ON to OFF instead of the capacitor. In this case, the power supply control circuit 17 constitutes the delay circuit.

Further, in the present embodiment, the deletion waiting data list is stored in the flash memory 23. However, a deletion waiting sector list, including identification information such as sector numbers for respectively identifying one or more sectors in which the deletion waiting data is stored, may be stored instead of the deletion waiting data. In this case, the complete deletion portion 61 selects sectors having sector numbers included in the deletion waiting sector list in order, completely deletes the selected sectors and deletes the sector numbers of the completely deleted sectors from the deletion waiting sector list. Further, the snapshot preparation portion 59 selects sectors having sector numbers included in the deletion waiting sector list in order, overwrites the selected sectors with snapshots, and deletes the sector numbers of the sectors that have been overwritten with the snapshots from the deletion waiting sector list.

While the MFP 100 is described as one example of the image processing apparatus in the above-mentioned embodiment, it is needless to say that the present invention can be specified as the activation control method for allowing the CPU 11 to execute the activation control process shown in FIGS. 4 to 6 and also the activation control program for allowing the CPU 11 to execute the activation control process.

Although embodiments of the present invention have been described and illustrated in detail, it is clearly understood that the same is by way of illustration and example only and not limitation, the scope of the present invention should be interpreted by the terms of the appended claims.

What is claimed is:
1. An image processing apparatus, comprising:
a volatile first memory;
a non-volatile second memory;
a hardware processor that is configured to access the first memory and the second memory;
a power supply that supplies power to the first memory, the second memory and the hardware processor; and
a delay unit that, in response to generation of a stop trigger for stopping supply of the power by the power supply, delays shut-off of the power supplied to the first memory, the second memory and the hardware processor, wherein the hardware processor
loads a program stored in the second memory into the first memory and executes a process defined by the program,
after execution of the program ends, deletes data stored in the second memory by execution of the program by overwriting the stored data with predetermined data for complete deletion of the stored data,
in response to the generation of the stop trigger for causing the power supply to stop supplying the power, stores data, stored in the first memory, in the second memory as a snapshot,
in response to generation of a start trigger for causing the power supply to start supplying the power, transfers the snapshot stored in the second memory to the first memory, and
in the case where prospective deletion data that is to be deleted is stored in the second memory in a stage where the stop trigger is generated, overwrites the prospective deletion data with the snapshot without overwriting the prospective deletion data with the predetermined data,
wherein:
(i) the hardware processor further compares a size of the snapshot with a size of the prospective deletion data, the hardware processor, the case where the size of the snapshot is larger than the size of the prospective deletion data, compresses the snapshot for storage, and in the case where the size of the snapshot is equal to or smaller than the size of the prospective deletion data, stores the snapshot without compressing the snapshot; or
(ii) the hardware processor, in the case where the size of the snapshot is smaller than the size of the prospective deletion data, deletes a portion, which has not be overwritten with the snapshot, of the prospective deletion data by overwriting the portion with the predetermined data; or
(iii) the hardware processor, in the case where the prospective deletion data to be deleted is stored in the second memory after storage of the snapshot in the second memory is completed, overwrites the prospective deletion data stored in the second memory with the predetermined data; or
(iv) the hardware processor,
after the stop trigger for causing the power supply to stop supplying the power is generated, stores prospective deletion data identification information for identifying prospective deletion data to be deleted in the second memory, and
in the case where the prospective deletion data identification information is stored in the second memory after the generation of the start trigger, overwrites the prospective deletion data identified by the prospective deletion data identification information with the predetermined data.

2. The image processing apparatus according to claim 1, wherein
the hardware processor further compares the size of the snapshot with the size of the prospective deletion data, wherein
the hardware processor, in the case where the size of the snapshot is larger than the size of the prospective deletion data, compresses the snapshot for storage, and in the case where the size of the snapshot is equal to or smaller than the size of the prospective deletion data, stores the snapshot without compressing the snapshot.

3. The image processing apparatus according to claim 1, wherein
the hardware processor, in the case where the size of the snapshot is smaller than the size of the prospective deletion data, deletes the portion, which has not be overwritten with the snapshot, of the prospective deletion data by overwriting the portion with the predetermined data.

4. The image processing apparatus according to claim 1, wherein
the hardware processor, in the case where the prospective deletion data to be deleted is stored in the second memory after storage of the snapshot in the second memory is completed, overwrites the prospective deletion data stored in the second memory with the predetermined data.

5. The image processing apparatus according to claim 1, wherein
the hardware processor,
after the stop trigger for causing the power supply to stop supplying the power is generated, stores the prospective deletion data identification information for identifying the prospective deletion data to be deleted in the second memory, and
in the case where the prospective deletion data identification information is stored in the second memory after the generation of the start trigger, overwrites the prospective deletion data identified by the prospective deletion data identification information with the predetermined data.

6. The image processing apparatus according to claim 1, wherein
the delay unit includes an electrical energy storage that stores the power supplied from the power supply, and supplies the power to the first memory, the second memory and the hardware processor in response to the stop of the supply of the power by the power supply.

7. The image processing apparatus according to claim 1, wherein
the predetermined data is zero-data.

8. An activation control method performed by a hardware processor that controls an image processing apparatus,
the image processing apparatus comprising:
a volatile first memory;
a non-volatile second memory;
a power supply that supplies power to the first memory, the second memory and the hardware processor; and
a delay unit that, in response to generation of a stop trigger for stopping supply of the power by the power supply, delays shut-off of the power supplied to the first memory, the second memory and the hardware processor, and
the activation control method causing the hardware processor to perform;
a process execution step of loading a program stored in the second memory into the first memory and executing a process defined by the program;
a complete deletion step of, after execution of the program ends, deleting data stored in the second memory by execution of the program in the process execution step by overwriting the data with predetermined data for complete deletion of the stored data;
a snapshot preparation step of, in response to generation of a stop trigger for causing the power supply to stop supplying the power, storing data, stored in the first memory, in the second memory as a snapshot; and an activation step of, in response to generation of a start trigger for causing the power supply to start supplying power, transferring the snapshot stored in the second memory to the first memory, wherein the snapshot preparation step includes a step of, in the case where prospective deletion data to be deleted in the complete deletion step is stored in the second memory in a stage where the stop trigger is generated, stopping deletion of the prospective deletion data and overwriting the prospective deletion data with the snapshot, (i) the activation control method causing the hardware processor to further perform;
a comparison step of comparing a size of the snapshot with a size of the prospective deletion data,
a compression step of compressing the snapshot; and
a switching step of, in the case where the size of the snapshot is larger than the size of the prospective deletion data, switching a storage mode to a compression mode in which the snapshot is compressed for storage, and in the case where the size of the snapshot is equal to or smaller than the size of the prospective deletion data, switching the storage mode to a non-compression mode in which the snapshot is stored without being compressed, or (ii) the activation control method causing the hardware processor to further perform a remaining portion deletion step of, in the case where a size of the snapshot is smaller than a size of the prospective deletion data, deleting a portion, which has not be overwritten with the snapshot, of the prospective deletion data by overwriting the portion with the predetermined data, or (iii) the activation control method causing the hardware processor to further perform a pre-stop deletion step of, in the case where prospective deletion data to be deleted in the complete deletion step is stored in the second memory after storage of the snapshot is completed in the snapshot preparation step, deleting the prospective deletion data stored in the second memory by overwriting the prospective deletion data with the predetermined data, or (iv) the activation control method causing the hardware processor to further perform:
a prospective deletion data identification information storage step of, after the stop trigger for causing the power supply to stop supplying the power is generated, storing prospective deletion data identification information, for identifying prospective deletion data to be deleted in the complete deletion step, in the second memory, and
a post-activation deletion step of, in the case where the prospective deletion data identification information is stored in the second memory after the generation of the start trigger, overwriting the prospective deletion data identified by the prospective deletion, data identification information with the predetermined data.

9. The activation control method according to claim 8, causing the hardware processor to further perform:
the comparison step of comparing the size of the snapshot with the size of the prospective deletion data,
the compression step of compressing the snapshot; and
the switching step of, in the case where the size of the snapshot is larger than the size of the prospective deletion data, switching the storage mode to the compression mode in which the snapshot is compressed for storage, and in the case where the size of the snapshot is equal to or smaller than the size of the prospective deletion data, switching the storage mode to the non-compression mode in which the snapshot is stored without being compressed.

10. The activation control method according to claim 8, causing the hardware processor to further perform the remaining portion deletion step of, in the case where the size of the snapshot is smaller than the size of the prospective deletion data, deleting the portion, which has not be overwritten with the snapshot, of the prospective deletion data by overwriting the portion with the predetermined data.

11. The activation control method according to claim 8, causing the hardware processor to further perform the pre-stop deletion step of, in the case where the prospective deletion data to be deleted in the complete deletion step is stored in the second memory after storage of the snapshot is completed in the snapshot preparation step, deleting the prospective deletion data stored in the second memory by overwriting the prospective deletion data with the predetermined data.

12. The activation control method according to claim 8, causing the hardware processor to further perform:
the prospective deletion data identification information storage step of, after the stop trigger for causing the power supply to stop supplying the power is generated, storing the prospective deletion data identification information, for identifying the prospective deletion data to be deleted in the complete deletion step, in the second memory, and
the post-activation deletion step of, in the case where the prospective deletion data identification information is stored in the second memory after the generation of the start trigger, overwriting the prospective deletion data identified by the prospective deletion data identification information with the predetermined data.

13. The activation control method according to claim 8, wherein
the delay unit stores an electrical energy storage (a capacitor) that stores the power supplied from the power supply, and in response to the stop of the supply of the power by the power supply, supplies power to the first memory, the second memory and the hardware processor.

14. The activation control method according to claim 8, wherein
the predetermined data is zero-data.

15. A non-transitory computer-readable recording medium encoded with an activation control program executed by a hardware processor that controls an image processing apparatus,
the image processing apparatus comprising:
a volatile first memory;
a non-volatile second memory; and
a delay unit that, in response to generation of a stop trigger for stopping supply of power by a power supply, delays shut-off of the power supplied to the first memory, the second memory and the hardware processor, and
the activation control program causing the hardware processor to perform:
a process execution step of loading a program stored in the second memory into the first memory and executing a process defined by the program;
a complete deletion step of, after execution of the program ends, deleting data stored in the second memory by execution of the program in the process execution step by overwriting the stored data with predetermined data for complete deletion of the stored data;

a snapshot preparation step of, in response to generation of a stop trigger for causing the power supply to stop supplying the power, storing data, stored in the first memory, in the second memory as a snapshot; and an activation step of, in response to generation of a start trigger for causing the power supply to start supplying the power, transferring the snapshot stored in the second memory to the first memory, wherein the snapshot preparation step includes a step of, in the case where prospective deletion data to be deleted in the complete deletion step is stored in the second memory in a stage where the stop trigger is generated, stopping deletion of the prospective deletion data and overwriting the prospective deletion data with the snapshot, (i) the activation control method causing the hardware processor to further perform;

a comparison step of comparing a size of the snapshot with a size of the prospective deletion data, a compression step of compressing the snapshot; and a switching step of, in the case where the size of the snapshot is larger than the size of the prospective deletion data, switching a storage mode to a compression mode in which the snapshot is compressed for storage, and in the case where the size of the snapshot is equal to or smaller than the size of the prospective deletion data, switching the storage mode to a non-compression mode in which the snapshot is stored without being compressed, or (ii) the activation control method causing the hardware processor to further perform a remaining portion deletion step of, in the case where a size of the snapshot is smaller than a size of the prospective deletion data, deleting a portion, which has not be overwritten with the snapshot, of the prospective deletion data by overwriting the portion with the predetermined data, or (iii) the activation control method causing the hardware processor to further perform a pre-stop deletion step of, in the case where prospective deletion data to be deleted in the complete deletion step is stored in the second memory after storage of the snapshot is completed in the snapshot preparation step, deleting the prospective deletion data stored in the second memory by overwriting the prospective deletion data with the predetermined data, or (iv) the activation control method causing the hardware processor to further perform;

a prospective deletion data identification information storage step of, after the stop trigger for causing the power supply to stop supplying the power is generated, storing prospective deletion data identification information, for identifying prospective deletion data to be deleted in the complete deletion step, in the second memory, and a post-activation deletion step of, in the case where the prospective deletion data identification information is stored in the second memory after the generation of the start trigger, overwriting the prospective deletion data identified by the prospective deletion data identification information with the predetermined data.

16. An image processing apparatus, comprising:

a hardware processor that controls the image processing apparatus;

a volatile first memory that stores operation environment information of the hardware processor; and a non-volatile second memory that stores image data to be processed by the image processing apparatus, wherein when an instruction to turn off a power supply of the image processing apparatus is given, the hardware processor overwrites the image data stored in the second memory with the operation environment information stored in the first memory to delete the image data before a supply of power to the hardware processor, the first memory, and the second memory ends, wherein when the hardware processor overwrites the image data stored in the second memory with the operation environment information stored in the first memory to delete the image data, in the case where a data size of the operation environment information is smaller than a size of the image data, the hardware processor overwrites a portion, which has not been overwritten with the operation environment information, of the image data with predetermined data to delete the portion.

17. The image processing apparatus according to claim 16, wherein when an instruction to turn on the power supply of the image processing apparatus is given, the hardware processor allows the operation environment information stored in the second memory to be stored in the first memory.

* * * * *